United States Patent [19]

Kohashi et al.

[11] 3,800,156

[45] Mar. 26, 1974

[54] INFRARED IMAGE CONVERTING DEVICE

[75] Inventors: Tadao Kohashi, Yokohama; Tadao Nakamura, Kawasaki, both of Japan

[73] Assignee: Matsushita Electric Industrial Co., Ltd., Osaka, Japan

[22] Filed: June 1, 1971

[21] Appl. No.: 149,084

Related U.S. Application Data

[63] Continuation of Ser. No. 659,703, Aug. 10, 1967, abandoned.

[30] Foreign Application Priority Data

Aug. 15, 1966 Japan .............................. 41-54083
Oct. 27, 1966 Japan .............................. 41-71312

[52] U.S. Cl. .............................................. 250/330
[51] Int. Cl. .............................................. G01j 1/02
[58] Field of Search ....... 250/83.3 H, 213, 83.3 HP, 250/330

[56] References Cited

UNITED STATES PATENTS 3,348,056 10/1967 Kohashi ............................ 250/213

OTHER PUBLICATIONS

Kohashi et al.; "EL–PC Image Intensifier Optoelectronic Devices and Circuits;" McGraw-Hill; 1964; pp. 182–186.

*Primary Examiner*—James W. Lawrence
*Assistant Examiner*—Davis L. Willis
*Attorney, Agent, or Firm*—Stevens, Davis, Miller & Mosher

[57] ABSTRACT

An infrared image converting device is provided with an infrared photoconductivity quenching layer and at least one electroluminescent layer, the latter layer representing a spectral luminescent energy curve which overlaps the spectral photoconductivity curve of the former layer at least partly in the wavelength range. The layers are disposed in such a manner that the luminous output from said latter layer is fed back to said former layer decreasingly with the increasing intensity of input infrared rays, thereby increasing the quenching effect.

14 Claims, 7 Drawing Figures

INVENTORS

TADAO KOHASHI, TADAO NAKAMURA

BY Stevens, Davis, Miller & Mosher

ATTORNEYS

Figure 1:
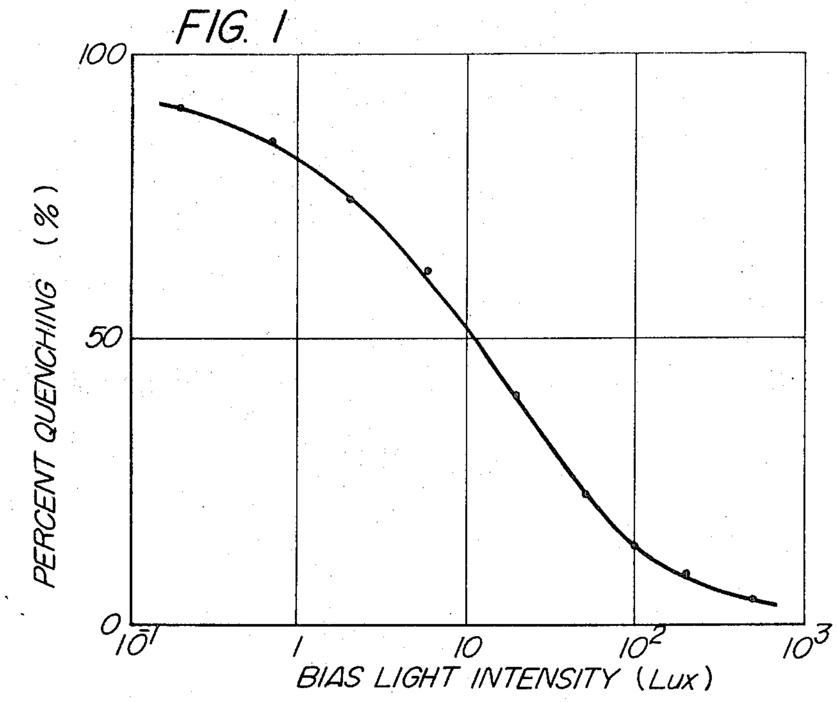

INVENTORS
TADAO KOHASHI, TADAO NAKAMURA

BY Stevens, Davis, Miller & Mosher

ATTORNEYS

INVENTORS

TADAO KOHASHI, TADAO NAKAMURA

BY Stevens, Davis, Miller & Mosher

ATTORNEYS

INFRARED IMAGE CONVERTING DEVICE

This application is a continuation of Ser. No. 659,703, filed Aug. 10, 1967 now abandoned.

This invention relates to an infrared image converting device utilizing the infrared ray quenching phenomenon, and more particularly it pertains to such device with an increased conversion efficiency.

The infrared photoconductivity quenching phenomenon, which is observed IIN II–VI group compounds such as CdS, CdSe, and III–V group compounds such as GaAs and the like, refers to such an effect that a photo-current excited through irradiation of a visible light is decreased with irradiation of infrared rays effected in superimposing relationship with the irradiation of the visible light. Commonly, a visible light to excite a photo-current is referred to as "bias light," and the photo-current thus excited is called "bias photocurrent." By combining such infrared photoconductivity quenching effect with an electroluminescent substance, it is posssible to realize a solid-state device for converting an infrared image to a visible image. A variety of systems have already been proposed. In such systems, at least an infrared photoconductivity quenching layer and an electroluminescent layer are combined with each other, power is supplied to such a combination, and a bias light is uniformly irradiated onto the infrared photconductivity quenching layer so that the latter is uniformly excited. In such a state an infrared image is projected onto said photoconductivity quenching layer in superimposing relationship with said bias light, and a voltage impressed on the electroluminescent layer is controlled in accordance with two-dimensional variations in the electrical impedance of the infrared photoconductivity quenching layer due to the quenching effect, so that the luminescence of the electroluminescent layer is two-dimensionally controlled, thus converting an infrared image into a visible image. The conventional devices of this type possess, however, some limitations for practical uses because of the following defects. 1. ) a separate optical system for projecting a bias light is needed in addition to an optical system for projecting an infrared image, the device becomes intricate and is not easy to manipulate, and, 2. ) a bright image with a high white-to-black ratio cannot be obtained, from the fact that the higher the intensity of the bias light used to obtain bright output image, the lower becomes the quenching effect.

This invention intends to eliminate the drawbacks described above and in addition provide a solid-state infrared image converting device with an enhanced conversion efficiency wherein a bias light is two-dimensionally modulated with an infrared image.

The device according to this invention is advantageous over the conventional infrared image converting devices using the infrared photoconductivity quenching in the following two points. That is, 1. An external optical system for supplying a bias light is eliminated so that the device is simplified in construction.

2. The bias light is two-dimensionally modulated with an infrared image so that the bias light corresponding to that portion onto which infrared rays are irradiated is decreased. Infrared photoconductivity quenching efficiency increases with the decrease of bias light. Thus, there can be provided an infrared image converting device with a high white-to-black in output visible image and an improved sensitivity.

In general, the infrared photoconductivity quenching efficiency decreases with increase in the bias light intensity. Such relationship is illustrated in FIG. 1 with respect to an infrared photoconductivity quenching powder of CdS doped with Cu and Ga. The powder material was bound with a plastic resin, and as a bias light source, an incandescent lamp was used, which was provided with a filter adapted to interrupt infrared rays. In this figure, the quantity indicated by "per cent quenching" refers to percentage of a current decreased in accordance with an infrared irradiation with respect to a bias photocurrent, therefore, the "per cent quenching" represents the infrared photoconductivity quenching efficiency. From the figure, it will be readily apparent that the quenching efficiency is high in the range where the intensity of the bias light is low.

In the conventional devices of this type, the intensity of bias light was increased to produce a brighter image. However, as can be presumed from the characteristic described above, such increase in the bias light intensity inevitably leads to decrease in the quenching efficiency, thus deteriorating the contrast of a converted visible image. In order that the infrared quenching effect may be efficiently utilized, a bias light of a lower intensity is advantageously applied. In practice, however, the electrical impedance of the infrared photoconductivity quenching layer is increased if such a weak bias light is used. In the case when a photoconductivity quenching layer is connected to an electroluminescent layer in series in an image converter, part of the applied voltage is divided across the former layer by its high impedance. This not only weakens the luminescence of the electroluminescent layer when an incident infrared image is to be converted to a visible image, of which the polarity is negative with respect to that of said incident infrared image, but also prevents the electroluminescent layer from being effectively controlled, thus greatly decreasing the image conversion efficiency. By using such a design, in the case where no infrared rays are irradiated, a strong bias light is uniformly applied so that the impedance of the infrared quenching layer is sufficiently decreased to produce a bright output luminescence while, in the case where infrared rays are irradiated in superimposing relationship with the bias light, the latter is weakened only with respect to that portion onto which the infrared rays are irradiated, the image conversion efficiency is greatly increased, thus resulting in a bright output visible image with an enhanced white-to-black ratio. Although these principles cannot be realized by the conventional devices using an external bias light source, they can easily be realized in accordance with this invention. By utilizing an oscillation phenomenon resulting from the light feedback, which will be described hereinafter, it is possible to observe an infrared conversion image having an improved white-to-black ratio under bright luminescence in the neighborhood of the limit of the electroluminescent substance in use. Although, in the foregoing, description has been made of the case where an incident infrared image is converted into a visible image of which the polarity is negative with respect to that of said incident infrared image, description can likewise be made of the case where an incident infrared image is converted into a visible image of which the polarity is positive with respect to said incident infrared image.

The device of this invention is characterized in that the luminescence emitted from at least one of a first electroluminescent layer serving as an output viewing surface and a second electroluminescent layer is fed back to an infrared photoconductivity quenching layer so as to be used as a bias light, and that the luminescence serving as bias light is controlled in accordance with variations in impedance of the infrared photoconductivity quenching layer due to irradiation of infrared rays, thus decreasing the intensity of the bias light applied to that portion onto which the infrared rays are irradiated, while at the same time eliminating the necessity for an external bias light source.

Other objects, features and advantages of this invention will become apparent from the following description taken in conjunction with the accompanying drawings.

FIG. 1 is a graph illustrating the relationship between the infrared ray quenching efficiency and the intensity of a bias light; and FIGS. 2, 3, 4, 5, 6 and 7 are sectional views showing infrared image converting devices according to embodiments of this invention, respectively.

EXAMPLE 1

Figure 2:
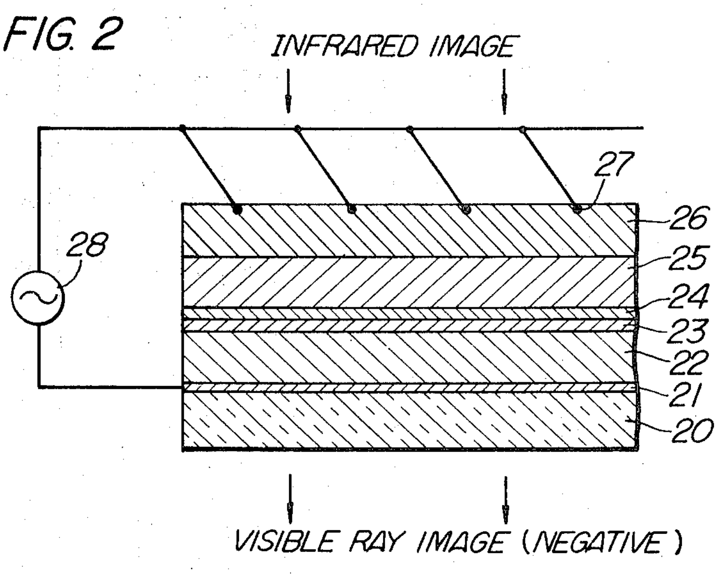

FIG. 2 shows an example of the device according to a first embodiment of this invention wherein an infrared image is subjected to negative conversion. The reference numeral 21 represents a first transparent electrode which is formed by coating a glass support plate 20 with a $SnO_2$ film. The reference numeral 22 denotes a first electro-luminescent layer about 40 microns in thickness which consists of a ZnS:Cu,Al powder bound with a plastic resin, 23 a light reflecting insulator layer about 10 microns in thickness which consists of $BaTiO_3$ bound with a plastic resin, 24 a light interrupting opaque layer about 10 microns in thickness consisting of carbon black, and 25 a second electroluminescent layer for supplying a bias light, said second electroluminescent layer being about 40 microns in thickness and consisting of ZnS, Cu, Al powder bound with a plastic resin. The layer 25 is selected so that the spectral luminescent energy curve thereof is in register with the spectral photoconductivity curve of a layer 26, described below, at least in a portion of the wavelength range. The reference numeral 26 denotes an infrared photoconductivity quenching layer about 50 microns in thickness consisting of a CdS powder bound with a plastic resin. The reference numeral 27 represents a second electrode consisting of tungsten wires 10 microns in diameter which are arranged at a pitch of 400 microns, and 28 an a.c. power source for applying an a.c. voltage between the electrodes 21 and 27.

If an a.c. voltage is applied between the electrodes 21 and 27 from the a.c. power source 28, the electroluminescent layers 22 and 25 produce luminescence, and the light emitted from the second electroluminescent layer is fed back to the quenching layer 26 so as to decrease the electrical impedance of said quenching layer. With such decrease in the impedance of the infrared ray quenching layer 26, the intensities of the light emitted from the electroluminescent layers 22 and 25 are further increased, resulting in further decrease of the impedance of the infrared ray quenching layer 26. However, this relation assumes a balanced condition at a steady level as the lower limit of the impedance of the quenching layer 26 or the saturation point of the light emission of the electroluminescent layer 25 is reached, which depends upon the applied voltage. Under such conditions, the first electroluminescent layer 22 adapted to produce an output image emits relatively bright light rays. By irradiating infrared rays onto the infrared ray quenching layer 26, the impedance thereof is increased due to the infrared quenching effect, so that the intensity of he light from that portion of the electroluminescent layer 25 is decreased (this is true of the electroluminescent layer 22, of course). The result is a decrease in the intensity of the bias light fed back to the infrared ray quenching layer 26. As described above with reference to FIG. 1, such a decrease in the intensity of the bias light leads to an increase of the quenching effect, thus further increasing the impedance of the infrared ray quenching layer. As a result, the impedance of the infrared ray quenching layer is changed in such a direction as to further weaken the bias light. The light emission from that portion of the electroluminescent layer 22 onto which infrared rays are irradiated becomes very small as compared with that from that portion of said layer 22 which is not subjected to the irradiation of infrared rays. In this way, a converted visible image with an excellent contrast can be observed on the electroluminescent layer 22.

As a variation of construction in present example, use may be made of the light from the layer 22 which passes through the layer 25, with the layers 24 and 23 being removed. In general, in accordance with this invention, a light feedback from at least one of the first electroluminescent layer and the additionally provided second electroluminescent layer is utilized.

The steady light emission from the electroluminescent layer 22, due to the light feedback from the electroluminescent layer 25 to the infrared ray quenching layer 26, is considered as a kind of oscillation phenomenon which can be controlled by voltage as described hereinbefore.

In this example, a strong oscillation was produced when the voltage and frequency of the a.c. power source 28 were set to 350V and 1KC, respectively. Thus a brighter output image with an excellent contrast could be produced by the electroluminescent layer 22 as compared with conventional device of this kind. In this case, however, the use of an oscillating condition or photoelectrically bistable condition inevitably causes an instability in a resultant image, which leads to a slight decrease in the resolution of the image. In the case where a high resolution is desired, the device should be operated in a non-oscillatory state or monostable state through application of a suitable lower voltage. In this case, the resulting image is not as bright as that produced in the foregoing example, while the resolution is greatly improved and an excellent half-tone display becomes possible. In an alternative method of operation, the voltage is set to a low value at which such a strong oscillation as described above does not occur, and an external bias light source is used at the same time, so that the light emission level can be changed. In this case, too, the resolution can greatly be improved, and a converted output image of medium brightness can be produced. Although, in this example, use was made of the electrode formed of wires arranged in parallel as the electrode provided on the infrared quenching layer, this invention is not limited to such configuration of the electrode, but in this invention use may be made of a mesh-like electrode formed of wires, a parallel gapped electrode formed of plates, or a plate electrode formed by depositing a metal to such a degree that infrared rays in use may pass therethrough, or the like.

EXAMPLE 2

Figure 3:
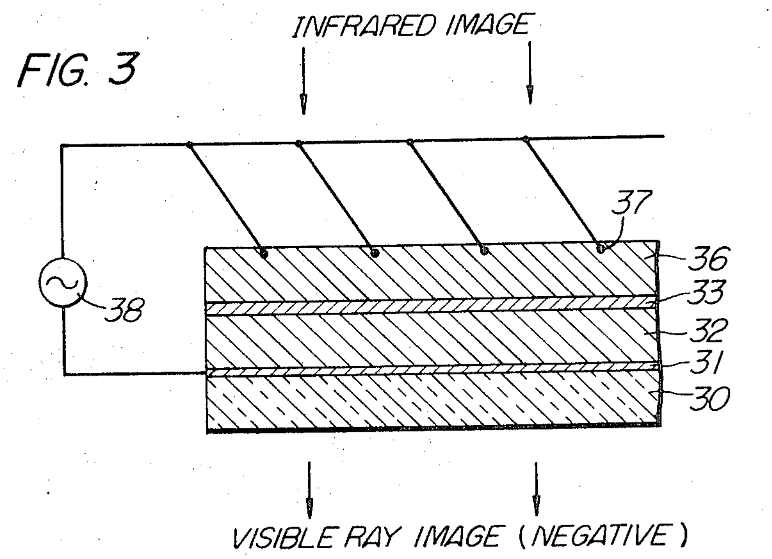

In this example, the second electroluminescent layer 25 provided in Example 1 was eliminated, and the first electroluminescent layer 22 was used in common. The structure of this example is illustrated in FIG. 3, wherein the material and composition of each of elements indicated by 30, 31, 32, 33, 36, 37 and 38 are similar to the material and composition of each of the elements represented by 20, 21, 22, 23, 26, 27 and 28 in FIG. 2. In this example, the layer 33 is a light feedback insulator layer adapted to permit light feedback and increase the dielectric strength. This example differs from the example illustrated in FIG. 2 in that the light interrupting opaque layer 24 and the second electroluminescent layer 25 are removed and the single electroluminescent layer 32 supplies a bias light to the quenching layer and serves as the output screen. The device according to this embodiment of this invention operates for negative conversion as is the case with the device described in Example 1. However, the applied voltage may be lower than that in Example 1, and the resolution can be improved. A converted image with a good white-to-black ratio was obtained while a strong oscillation was being produced at 300V and 1KC.

In view of the objects of this invention, it will be readily appreciated that in this example, too, the revolution at a lower voltage can be improved and the resolution and brightness can be enhanced through the use of an external bias light source as in Example 1. Furthermore, the electrode 37 may take various forms as is the case with electrode 27 provided in Example 1.

EXAMPLE 3

Figure 4:
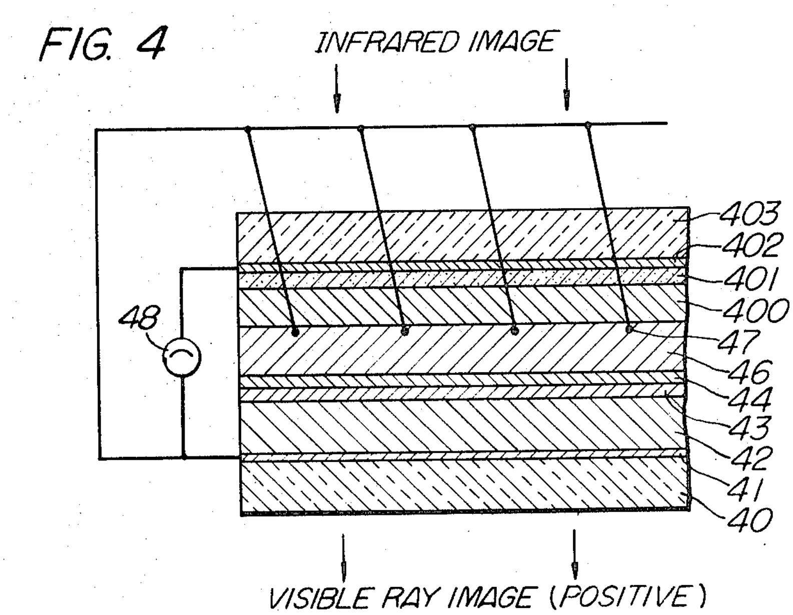

FIG. 4 shows an example wherein infrared rays are subjected to positive conversion. In this figure, the material and composition of each of elements represented by 40, 41, 42, 43, 44, 46, 47 and 48 are similar to the materal and composition of each of the elements indicated by 20, 21, 22, 23, 24, 26, 27 and 28 in FIG. 2 showing the construction of Example 1. The reference numeral 400 represents an incident infrared ray permeating impedance layer which is, for example, a transparent dielectric layer formed of polyester. This layer is about 25 microns in thickness and is adhered to the quenching layer 46 with such an adhesive agent as silicon resin which passes the incident infrared rays therethrough. The reference numeral 401 indicates a second electroluminescent layer consisting of a ZnS, Cu, Al powder dispersed in a silicon resin, said layer being adapted for supplying a bias light and capable of passing the incident infrared rays therethrough. In this case, the ZnS, Cu, Al powder is thinly and uniformly dispersed so as to prevent the infrared rays from being diffused and enable them to pass through the layer 401. The reference numeral 402 denotes an incident infrared ray permeating electrode which is a $SnO_2$ transparent electrode coated on a support plate 403 of quartz or glass.

Description will now be made of the operational principles of this embodiment.

By applying a voltage from the a.c. power source 48, the second electroluminescent layer 401 is caused to produce a slight light emission, which decreases the impedance of the quenching layer 46, so that a current by-passed to the tungsten wire electrode 47 is increased, with the result that the light emission from the second electroluminescent layer 401 is further increased. Finally, a similar steady balanced condition to that described above will be reached. Under such condition, the current is substantially by-passed through the element 47, and it does not flow through the first electroluminescent layer 42. Therefore, this layer does not produce any light emission. In such a state, if infrared rays are irradiated onto the quenching layer 46, the impedance of this layer is increased due to the quenching effect. Hence, the current by-passed through the element 47 is decreased, so that the light emission from the electroluminescent layer 401 which serves as a bias light source is decreased. As a result, the quenching efficiency is further enhanced.

Furthermore, the increase in the impedance of the quenching layer 46 causes the current by-passed through the electrode 47 to be decreased, while at the same time causing the current flowing through the first electroluminescent layer 42 to be increased. Thus, the layer 42 produces light emission, which provides a converted visible image with an excellent white-to-black ratio which is in positive relationship with respect to an infrared image. This device also operates both under a condition where a strong oscillation occurs and a condition where the voltage is too low for oscillation to occur, as in Examples 1 and 2 described above, to effectively convert an infrared image to a visible image of which the polarity is positive with respect to that of the infrared image by using an external bias light source at the same time. By the first method, there was produced an image with a high white-to-black ratio, which was somewhat poor in resolution but possessed a lower luminance level in the dark, and by the second and third methods, there were produced images with an improved resolution and a high white-to-black ratio and with half tone. The voltage at which a strong oscillation is caused depends upon the degree of dispersion of the electroluminescent powder in the second electroluminescent layer 401. In this example, such oscillation was caused at 1,300V and 1KC.

The layers 400 and 401 constitute a composite electroluminescent impedance layer of high dielectric strength. The order in position of the layers 400 and 401 may be reversed to form such a composite layer. Alternatively, only the layer 401 may be provided, with the layer 400 removed.

While the arrangement of FIG. 4 is shown as being operated through application of the a.c. voltage indicated by 48, the desired operation can also be obtained by means of a double voltage supply system in which another a.c. voltage source having the same frequency as the voltage source 48 is applied across the electrodes 47 and 41 without short-circuiting these electrodes. In this case, the light emission from the layer 42 is an increasing function of the amplitude $|\dot{I}_3|=|\dot{I}_1+\dot{I}_2|$ of a composite current $\dot{I}_3=\dot{I}_1+\dot{I}_2$ of an a.c. current $I_1$ related to the a.c. voltage impressed by the voltage source 48 onto the layer 42 and to the impedance of the layer 46 and an a.c. current $I_2$ related to the a.c. voltage impressed by the other voltage source. Therefore, by adjusting or changing the relation in amplitude or phase between the voltages respectively impressed by the source 48 and the other source, the operational characteristics can variously be adjusted or changed. This constitutes one of the great advantages of this invention. Such voltage supply can be achieved even in the embodiments shown in FIGS. 2 and 3 by configuring the electrodes 27 and 37, respectively in the form of a gapped electrode, providing infrared ray permeating electrodes on the layers 26 and 36 through infrared ray permeating impedance layers respectively, and applying a.c. voltages having the same frequencies as those of the a.c. power sources 28 and 38 across the electrode 21 and the infrared permeable electrode on the layer 26 and across the electrode 31 and the infrared permeable electrode on the layer 36, respectively. In these cases, the light emission from each of the layers 22 and 32 is an increasing function of the amplitude $|\dot{I}_3|=|\dot{I}_1+\dot{I}_2|$ of the composite current of an a.c. current $I_1$ related to the voltage 28 or 38 and the electrical impedance of the layer 26 or 36 and an a.c. current $I_2$ related to the voltage 29 or 39. Therefore, by selecting the relations in amplitude and phase between the voltages 28 and 29 or the voltages 38 and 39 so that $|\dot{I}_1|>|\dot{I}_2|$ and $\dot{I}_1$ and $\dot{I}_2$ become differential, the contrast and brightness ranges of an output image can be adjusted. In addition, the operational characteristics can widely be adjusted or changed by adjusting or changing at least one of the amplitude and phase relations described above.

In the foregoing, description has been made of the case where the light feedback is directly effected from the electroluminescent layer to the infrared photoconductivity quenching layer. However, a thin translucent light feedback controlling layer may be interposed between the electroluminescent layer adapted to carry out the light feedback and the infrared conductivity quenching layer, thereby controlling the extent of the light feedback.

If the light feedback controlling layer is provided on that side of the infrared photoconduction quenching layer onto which the infrared rays are irradiated, the spectral transmission thereof is selected such that the infrared rays may pass therethrough. It is also possible that the light feedback controlling layer serves as one component layer of the composite electroluminescent impedance layer in place of, for example, the incident infrared ray permeating layer 400.

Next, concrete description will be made of an embodiment of this invention wherein the light feedback of the light emission from the electroluminescent layer to the infrared photoconductivity quenching layer is controlled to prevent a bistable state from occurring due to an oscillatory condition, so that image conversion can be effected with an improved contrast and a high brightness. The image conversion in the examples to follow are effected in essentially the same manner as the operations of the aforementioned examples in which an external bias light source is or is not used under the monostable condition, thus providing a high stability and a superior resolution.

EXAMPLE 4

Figure 5:
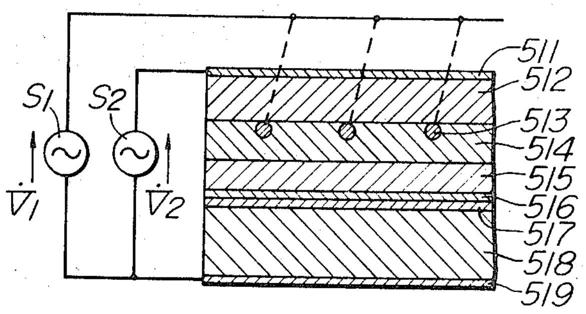

Referring to FIG. 5, the reference numeral 511 represents an infrared ray permeating electrode which may be formed of $SnO_2$ coated on a glass or quartz plate which is not illustrated in the figure, a mesh-like gapped electrode or a metal thin film. The reference numeral 512 denotes a dielectric layer or electrical impedance layer which is transparent with respect to infrared rays, said layer being formed of polyester or the like about 30 microns in thickness. The reference numeral 513 indicates an electrode formed by arranging tungsten wires about 10 microns in diameter in a parallel or mesh-like pattern at a pitch of about 400 microns. The reference numeral 514 represents an infrared photoconductive quenching layer about 50 microns in thickness which is formed of a CdS infrared peotoconductivity quenching powder activated with $I_b$ and $VII_b$ or $III_b$ elements or the like and bound with a plastic resin. The reference numeral 515 indicates a second electroluminescent layer adapted to supply bias light rays to the infrared photoconductive quenching layer 514 and which is formed of a material representing a spectral luminescent energy distribution which scarcely overlaps the spectral sensitivity of the infrared photoconductivity quenching layer, thereby decreasing the light feedback. In the case where CdS is used as the infrared photoconductivity quenching material, for example, use may be made of an electroluminescent material adapted for the emission of blue light such as ZnS:Cu, Cl which is about 30 microns in thickness and bound with a plastic material. Even if the spectral sensitivity is in register with the spectral luminescent energy, an electroluminescent powder with a low emission efficiency can equally be employed. The reference numeral 516 represents a light interrupting opaque layer of black paint or the like having a high resistance, 517 a light reflecting insulator layer, 518 a first electroluminescent layer for providing an output image, said layer being formed of an electroluminescent material such as ZnS: Cu, Al or the like capable of emitting green light which is bound with a plastic resin and about 30 microns in thickness, and 519 a transparent electrode of $SnO_2$ or the like attached to a base plate of glass or the like, which is not illustrated.

$S_1$ is an a.c. power source which applies an operating voltage between the arranged electrodes 513 and the electrode 519, and $S_2$ is an auxiliary a.c. power source adapted to apply a voltage between the electrodes 511 and 519 for the purpose of exciting the second electroluminescent layer 515 for supplying bias light. The voltage $\dot{V}_2$ of the power source $S_2$ is so selected that it has the same frequency as that of the voltage $\dot{V}_1$ of the power source $S_1$ and is in phase with the latter.

A remarked feature of the infrared image converting device having the aforementioned arrangement is that the light feedback from the electroluminescent layer to the infrared photoconductivity quenching layer is reduced and an auxiliary voltage in phase with the operating voltage is applied to the latter. With such arrangement, the quantity of light feedback is so small that even if the second electroluminescent layer 515 is caused to produce light emission by increasing the voltage $\dot{V}_1$ up to a value at which the first electroluminescent layer 518 produces light emission, the output light from the electroluminescent layer 515 is not effectively fed back to the quenching layer 514 and therefore oscillation does not occur between the quenching layer 514 and second electroluminescent layer 515. In this condition by applying the in-phase voltage $V_2$ from the auxiliary power source $S_2$ across the electrodes 511 and 519, the light emission from the second electroluminescent layer 515 for supplying internal bias light is further increased so that the increased bias light is supplied to the quenching layer 514, with subsequent increase of the emission from the first electroluminescent layer 518, i.e., output screen. Even under such a condition, the luminance of the second electroluminescent layer is not sufficiently fed back to the quenching layer 514 to cause an oscillation, so that the electroluminescent layer 515 and the quenching layer 514 do not assume a bistable state. This means that the quenching layer 514 is merely irradiated with the internal bias light from the second electroluminescent layer 515, that is, these are in monostable state.

In such state, by projecting an infrared image onto the quenching layer 514, the photoconductivity excited by the biasing electroluminescent layer 515 is decreased, with a result that the light emission from each of the electroluminescent layers 515 and 518 is decreased. With decrease of the light emission from the electroluminescent layer 515 serving as a bias light source, the bias light supplied to the quenching layer 514 is decreased. Thus, the quenching efficiency is further enhanced, as will be seen from the aforementioned characteristics of the quenching effect. This further decreases the photoconductivity, resulting in further decrease of the light emission from each of the electroluminescent layers 515 and 518. Such process will settle at a steady level corresponding to the infrared intensity. In the operating system of this embodiment, the electroluminescent layer-infrared quenching layer system is enabled to operate in a monostable state as described above, so that a half-tone image display becomes possible, unlike the bistable operation. The actual operation was carried out at 300V and 1KC of $\dot{V}_1$ and at 0 – 800V and 1KC of $\dot{V}_2$ which were in phase with each other. If the voltage $\dot{V}_2$ is too low, the quantity of bias light becomes insufficient so that the brightness of a resulting output image becomes low, while if the voltage $\dot{V}_2$ is so high that it exceeds the voltage $\dot{V}_1$ applied from the power source $S_1$ across the electrodes 513 and 519, voltage variations in the electroluminescent layer 518 due to the irradiation of infrared rays are masked by the voltage $\dot{V}_2$. From this, it will be seen that there is an optimum voltage range.

In this example, the voltage $\dot{V}_2$ was selected in the range of 200 to 500V, whereby a bright output image with a high white-to-black ratio was produced.

In accordance with this embodiment, there is provided a solid-state infrared image converting device of a simplified construction including no external bias light source, thereby eliminating drawbacks observed in a construction having a bias light supplying electroluminescent layer provided therein such as difficulties encountered in achieving half-tone display due to the use of a bistable state and deterioration in brightness due to application of an extremely high voltage to the electroluminescent layer. Furthermore, emphasis should be placed on the selection of $\dot{V}_2$. That is, the white-to-black ratio, gamma and brightness can be set as desired by suitably selecting the amplitude of the voltage $\dot{V}_2$ in the optimum range as described above.

EXAMPLE 5

Figure 6:
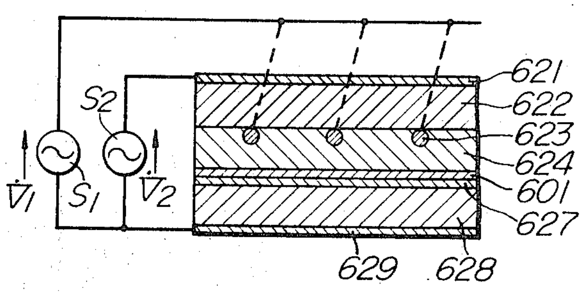

FIG. 6 shows a still further embodiment of this invention. In this figure, elements indicated by 621, 622, 623, 624, 627, 628, 629, $S_1$, $S_2$, $V_1$ and $V_2$ are similar to those represented by 511, 512, 513, 514, 517, 518, 519, $S_1$, $S_2$, $V_1$ and $V_2$ in FIG. 5, respectively. The feature of this embodiment is that light feedback to the infrared quenching layer 624 is decreased by enabling the output image display electroluminescent layer to serve as bias light supplying electroluminescent layer and providing a light feedback controlling layer 601 between the electroluminescent layer 628 and the infrared quenching layer 624. The light feedback controlling layer 601 may be formed of a material with a suitable light transmission such as carbon black, black paint or the like. The operation of this embodiment can be understood in a similar way to Example 4. Good results have experimentally been obtained as in the embodiment illustrated in FIG. 4.

EXAMPLE 6

Figure 7:
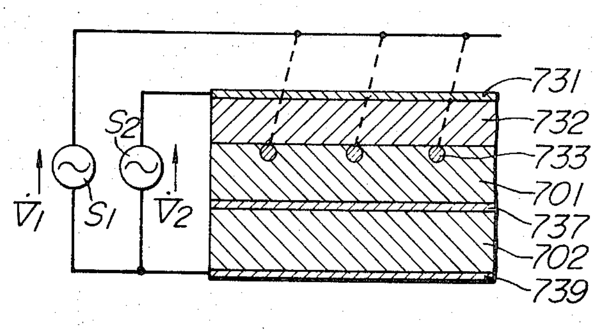

FIG. 7 shows still another embodiment of this invention, wherein elements represented by 731, 732, 733, 737, 739, $S_1$, $S_2$, $V_1$ and $V_2$ are similar to those indicated by 511, 512, 513, 517, 519, $S_1$, $S_2$, $V_1$ and $V_2$ in FIG. 5, respectively.

The feature of this embodiment is that there is provided an electroluminescent layer 702 which serves both as an output image display layer and a bias light supplying layer and the quantity of light feedback is controlled by suitably selecting the spectral sensitivity of an infrared photoconductivity quenching layer 701 and the spectral luminescent energy distribution of an electroluminescent layer 702. In this embodiment, the electroluminescent layer 702 was formed of a ZnS:Cu, Al electroluminescent material capable of producing green light of which the light emission peak appears at a wavelength of about 530 millimicrons, and the quenching layer 701 was made of an infrared photoconductivity quenching material sensitive to a wavelength above 600 millimicrons the major component of which is CdS-Se. Similarly, good results have been obtained by making the electroluminescent layer 702 of ZnS:Cu, Cl capable of producing blue light which was employed in Example 1 and forming the quenching layer 701 of the CdS materal which was used in Example 4. The operation of this embodiment can be appreciated in the same way as those of Examples 4 and 5. According to this embodiment, it is possible to obtain good results similar to those obtained in Examples 4 and 5.

In the operating methods described in Examples 4, 5 and 6, the voltages $\dot{V}_1$ and $\dot{V}_2$ of the power sources indicated by $S_1$ and $S_2$ were so selected as to have the same frequency and be in phase with each other. In an alternative method, however, it is possible to set $\dot{V}_1$ and $\dot{V}_2$ to different frequencies. By this alternative method, a bright visible output image with a high white-to-black ratio and representing half-tone display can be produced by controlling only the amplitudes of the voltages $\dot{V}_1$ and $\dot{V}_2$ without paying attention to the relation in phase therebetween. In addition, the white-to-black ratio, gamma and brightness can freely be controlled through selection of the amplitudes of the voltages $\dot{V}_1$ and $\dot{V}_2$.

In the foregoing, various embodiments of this invention have been illustrated and described, and from these embodiments, it will be appreciated that the infrared image converting device using the infrared photoconductivity quenching effect in accordance with this invention is free from deterioration in the image conversion efficiency and complexity in the conventional system including an external bias light source. Also, it is possible to produce a converted visible image with a high white-to-black ratio and resolution by modulating bias light from a bias light source incorporated in the device with an infrared image and shifting the bias light to portions with a high quenching efficiency. According to this invention, therefore, there is provided a solid-state infrared image converting device utilizing the infrared photoconductivity quenching effect wherein half-tone display with a high white-to-black ratio is possible and the white-to-black ratio, gamma and brightness of an output visible image can freely be controlled by adjusting of the operating voltage.

Various combinations of the embodiments described above are possible without departing from the spirit and scope of this invention. The device of this invention can equally be applied to various dark field panels, infrared viewing panels or the like.

What is claimed is:

1. An infrared image converting device comprising in combination:

a. an infrared photoconductivity quenching layer made of a material selected from the group consisting of CdS, CdSe, CdS-Se and GaAs, b. an electroluminescent layer made of a ZnS phosphor including an activator to produce electroluminescence, said electroluminescent layer being disposed to feed bias light back to said infrared photoconductivity quenching layer decreasingly with the increasing intensity of infrared rays irradiated onto said infrared photoconductivity quenching layer, c. first and second electrodes respectively disposed on said electroluminescent layer and said infrared photoconductivity quenching layer, said first electrode being permeable to visible rays and said second electrode being made in the form of a gapped electrode of fine metal wire thereby to cause infrared rays to permeate, and d. means to apply an a.c. voltage across said electrodes.

2. An infrared image converting device as set forth in claim 1 further comprising an external light source to bias said infrared photoconductivity quenching layer.

3. An infrared image converting device as set forth in claim 1, wherein the output voltage of the said a.c. voltage supply means is variable.

4. An infrared image converting device as set forth in claim 1, wherein a translucent light feedback controlling layer is provided between said infrared photoconductivity quenching layer and said electroluminescent layer.

5. An infrared image converting device according to claim 1, further comprising a light feedback controlling layer made of $BaTiO_3$ interposed between said infrared photoconductivity quenching layer and said electroluminescent layer.

6. An infrared image converting device according to claim 1, further comprising an opaque layer and a further electroluminescent layer made of a ZnS phosphor including an activator to produce electroluminescence interposed between said first-mentioned electroluminescent layer and said first electrode, said opaque layer being located between said first-mentioned and said further electroluminescent layers, whereby said first-mentioned electroluminescent layer is adapted to feed the output luminance therefrom back to said infrared photo-conductivity quenching layer while said further electroluminescent layer is adapted to display a visible image converted from an infrared image.

7. An infrared image converting device according to claim 1, further comprising an impedance layer disposed on the surface of said infrared photoconductivity quenching layer remote from said electroluminescent layer, said impedance layer being permeable to infrared rays, a third electrode disposed on the surface of said impedance layer remote from said infrared photoconductivity quenching layer, said third electrode being permeable to infrared rays, and a further means to apply an a.c. voltage across said first and third electrodes.

8. An infrared image converting device as set forth in claim 7, wherein the a.c. voltage across said first electrode and said second electrode and across said first electrode and said third electrode have the same frequency and are in phase with each other.

9. An infrared image converting device as set forth in claim 7, wherein the a.c. voltages across said first electrode and said second electrode and across said first electrode and said third electrode have different frequencies.

10. An infrared image converting device as set forth in claim 7, comprising an opaque layer and a further electroluminescent layer made of ZnS phosphor, said layers being interposed between said first-mentioned electroluminescent layer and said first electrode in such a manner that said opaque layer lies between said first-mentioned electroluminescent layer and said further electroluminescent layer, whereby said first-mentioned electroluminescent layer is adapted to feed the output luminance therefrom back to said infrared photoconductivity quenching layer while said further electroluminescent layer is adapted to display a visible image converted from an infrared image.

11. An infrared image converting device comprising in combination:

a. an infrared photoconductivity quenching layer made of a material selected from the group consisting of CdS, CdSe, CdS-Se and GaAs, b. first and second electroluminescent layers respectively disposed on opposite sides of said infrared photoconductivity quenching layer, said electroluminescent layers being made of a ZnS phosphor including an activator to produce electroluminescence, c. an opaque layer interposed between said infrared photoconductivity quenching layer and said first electroluminescent layer, whereby said first electroluminescent layer is adapted to display a visible image converted from an infrared image while said second electroluminescent layer is adpated to feed the luminous output therefrom back to said infrared photoconductivity quenching layer as a bias light, d. a first electrode disposed on the surface of said first electroluminescent layer remote from said opaque layer, said first electrode being permeable to visible rays, e. a second electrode disposed at said infrared photoconductivity quenching layer, said second electrode being made in the form of a gapped electrode of fine metal wire thereby to cause infrared rays to permeate, f. a third electrode disposed on the surface of said second electroluminescent layer remote from said infrared photoconductivity quenching layer, said third electrode being permeable to infrared rays, and g. means to apply an a.c. voltage at least across said first electrode and said third electrode, whereby the conductivity of said infrared photoconductivity quenching layer is decreased as incident infrared rays increase to thereby decrease the current flowing across said layers, said bias light being accordingly decreased, the infrared sensitivity of said infrared photoconductivity quenching layer being thus enhanced.

12. An infrared image converting device as set forth in claim 11, wherein the a.c. voltages have the same frequency and have at least one of the phase and amplitude relations therebetween made variable.

13. An infrared image converting device according to claim 11, wherein said first and second electrodes are connected to each other.

14. An infrared image converting device as set forth in cliam 11, wherein a thin light permeating insulator layer interposed between said second electroluminescent layer and said infrared photoconductivity quenching layer.

* * * * *